(12) United States Patent
Bedard et al.

(10) Patent No.: US 7,289,927 B2
(45) Date of Patent: Oct. 30, 2007

(54) METHOD AND APPARATUS FOR THE MONITORING OF BODY TEMPERATURE AND/OR BLOOD FLOW

(75) Inventors: Michel Bedard, Saint-Augustin-de-Desmaures (CA); Dany Nolet, Ancienne-Lorette (CA)

(73) Assignee: Cybiocare, Inc., Quebec (CA)

( * ) Notice: Subject to any disclaimer, the term of this patent is extended or adjusted under 35 U.S.C. 154(b) by 10 days.

(21) Appl. No.: 11/187,301

(22) Filed: Jul. 22, 2005

(65) Prior Publication Data

US 2006/0047467 A1   Mar. 2, 2006

Related U.S. Application Data

(60) Provisional application No. 60/590,417, filed on Jul. 23, 2004.

(51) Int. Cl.
    G01J 5/02   (2006.01)
(52) U.S. Cl. .............. 702/130; 702/131; 374/133; 600/549; 600/474
(58) Field of Classification Search ........ 702/130–131; 374/133
    See application file for complete search history.

(56) References Cited

U.S. PATENT DOCUMENTS

| | | | |
|---|---|---|---|
| 5,559,497 A | 9/1996 | Hong | |
| 5,816,706 A | 10/1998 | Heikkila et al. | |
| 6,056,435 A * | 5/2000 | Pompei | 374/133 |
| 6,280,397 B1 | 8/2001 | Yarden et al. | |
| 6,394,648 B1 | 5/2002 | Tseng | |
| 2003/0212339 A1 | 11/2003 | Lussier et al. | |
| 2003/0212340 A1 | 11/2003 | Lussier et al. | |
| 2004/0116822 A1 | 6/2004 | Lindsey | |

* cited by examiner

*Primary Examiner*—John Barlow
*Assistant Examiner*—Sujoy Kundu
(74) *Attorney, Agent, or Firm*—Seyfarth Shaw LLP

(57) ABSTRACT

A method and apparatus for estimating a body temperature and/or an ambient air temperature and/or blood flow. The method and apparatus acquire values indicative of temperature from two or more sensors. Some of the sensors being in thermal contact with a surface of the body and the other sensors being in thermal contact with the ambient air. A transfer function is then applied to the values from the sensors in order to form an estimate of the body temperature and/or the ambient air temperature and/or blood flow. The transfer function is indicative of a thermal relationship between the body temperature, the values of the sensors, the ambient air temperature and the blood flow.

14 Claims, 4 Drawing Sheets

US 7,289,927 B2

METHOD AND APPARATUS FOR THE MONITORING OF BODY TEMPERATURE AND/OR BLOOD FLOW

CROSS-REFERENCE TO RELATED APPLICATION

This application claims the benefits of U.S. provisional patent applications No. 60/590,417 filed Jul. 23, 2004; which is hereby incorporated by reference.

TECHNICAL FIELD

The present invention relates to a method and apparatus for the monitoring of body temperature.

BACKGROUND

Various methods and an apparatuses for determining the internal temperature of a living body or of an object have been developed. Typically, clinical thermometers are required for measuring the body temperature of a living being. Such thermometers are usually inserted, for example, in the mouth or ear of the patient so as to get as close a reading of the internal body as possible. Such thermometers are unpractical when frequent or continuous temperature measurements are required.

Other solutions have been developed such as thermometers measuring the temperature of a human being from the surface of the skin or of the body of an object from its surface. For example U.S. Pat. No. 5,816,706 discloses a method and apparatus comprising measuring thermal flux from the surface of an object through a structure which is positioned against it and whose thermal conductivity is known. The disclosed method and apparatus use a static thermal model of the thermal flux that provides for thermal resistivity but does not take into account thermal capacity, i.e. the capacity of storing thermal energy. This causes problems when the apparatus is subject to rapid or instantaneous change in ambient temperature as this will be reflected by an equally rapid or instantaneous change on estimated body temperature, and vice versa.

Thus, there is a need for a dynamic method and apparatus for measuring the temperature of a human being from the surface of the skin, or of the body of an object from its surface, so that it does not provide erroneous values when subjected to rapid or instantaneous temperature changes.

SUMMARY

The present invention relates to a method for estimating a body temperature and/or an ambient air temperature. The method starts by acquiring values indicative of temperature from two sensors. The first sensor being in thermal contact with a surface of the body and the second sensor being in thermal contact with the ambient air. A transfer function is then applied to the values from the first and second sensors in order to form an estimate of the body temperature and/or the ambient air temperature. The transfer function is indicative of a thermal relationship between the body temperature, the values of the first sensor, the ambient air temperature and the values of the second sensor.

The present invention also relates to a monitoring apparatus for estimating a body temperature and/or an ambient air temperature. The apparatus comprises a casing which includes a first sensor having an output indicative of temperature, the first sensor being positioned adjacent a first surface of the casing, a second sensor having an output indicative of temperature, the second sensor being positioned adjacent a second surface of the casing; an analog to digital converter having a first input connected to the output of the first sensor, a second input connected to the output of the second sensor and an output, a micro-controller having an input connected to the output of the analog to digital converter and an output, and a casing fastener for fastening the casing to the body. The micro-controller includes an algorithm for computing the estimate of the body temperature and/or ambient air temperature using a mathematical model indicative of a thermal relationship between the body temperature, the values of the first sensor, the ambient air temperature and the values of the second sensor, the algorithm providing the estimate to the output of the micro-controller.

The present invention further relates to a method for estimating a body temperature and/or an ambient air temperature and/or a blood flow. The method starts by acquiring values indicative of temperature from three sensors. The first being in thermal contact with a surface of the body, the second being in thermal contact with the ambient air and the third being in thermal contact with either the surface of the body or the ambient air. A transfer function is then applied to the values from the first, second and third sensors in order to form an estimate of the body temperature and/or the ambient air temperature and/or the blood flow. The transfer function is indicative of a thermal relationship between the body temperature, the values of the first, second and third sensors, the blood flow and the ambient air temperature.

The present invention further still relates to a monitoring apparatus for estimating a body temperature and/or an ambient air temperature and/or a blood flow. The apparatus comprises a casing which includes a first sensor having an output indicative of temperature, the first sensor being positioned adjacent a first surface of the casing, a second sensor having an output indicative of temperature, the second sensor being positioned adjacent a second surface of the casing and a third sensor having an output indicative of temperature, the third sensor being positioned adjacent a third surface of the casing; an analog to digital converter having a first input connected to the output of the first sensor, a second input connected to the output of the second sensor and a third input connected to the output of the third sensor, a micro-controller having an input connected to the output of the analog to digital converter and an output, and a casing fastener for fastening the casing to the body. The micro-controller includes an algorithm for computing the estimate of the body temperature and/or ambient air temperature and/or blood flow using a mathematical model indicative of a thermal relationship between the body temperature, the values of the first, second and third, the blood flow and the ambient air temperature, the algorithm providing the estimate to the output of the micro-controller. It is to be understood that the third surface may be the same as the first or the second surface.

It is to be understood that the expression "temperature sensor" is to be construed here and in the appended claims as any sensor which has an output which varies according to the temperature. It is also to be understood that the term "body" is to be construed here and in the appended claims as either the body of a living being or nonliving matter, inanimate object etc.

The foregoing and other objects, advantages and features of the present invention will become more apparent upon reading of the following non restrictive description of an illustrative embodiment thereof, given by way of example only with reference to the accompanying drawings.

BRIEF DESCRIPTION OF THE FIGURES

A non-limitative embodiment of the invention will now be described by way of example only with reference to the accompanying drawings, in which.

DETAILED DESCRIPTION

Generally stated, an apparatus according to an illustrative embodiment of the present invention estimates the temperature of a body it is in contact with as well as that of ambient air. In order to estimate those temperatures, the apparatus uses two thermistors, one in contact with the body and the other in contact with the ambient air, and mathematical models of the thermal flux between the body and its associated thermistor, of the two thermistors and of the ambient air and its associated thermistor.

Figure 1:
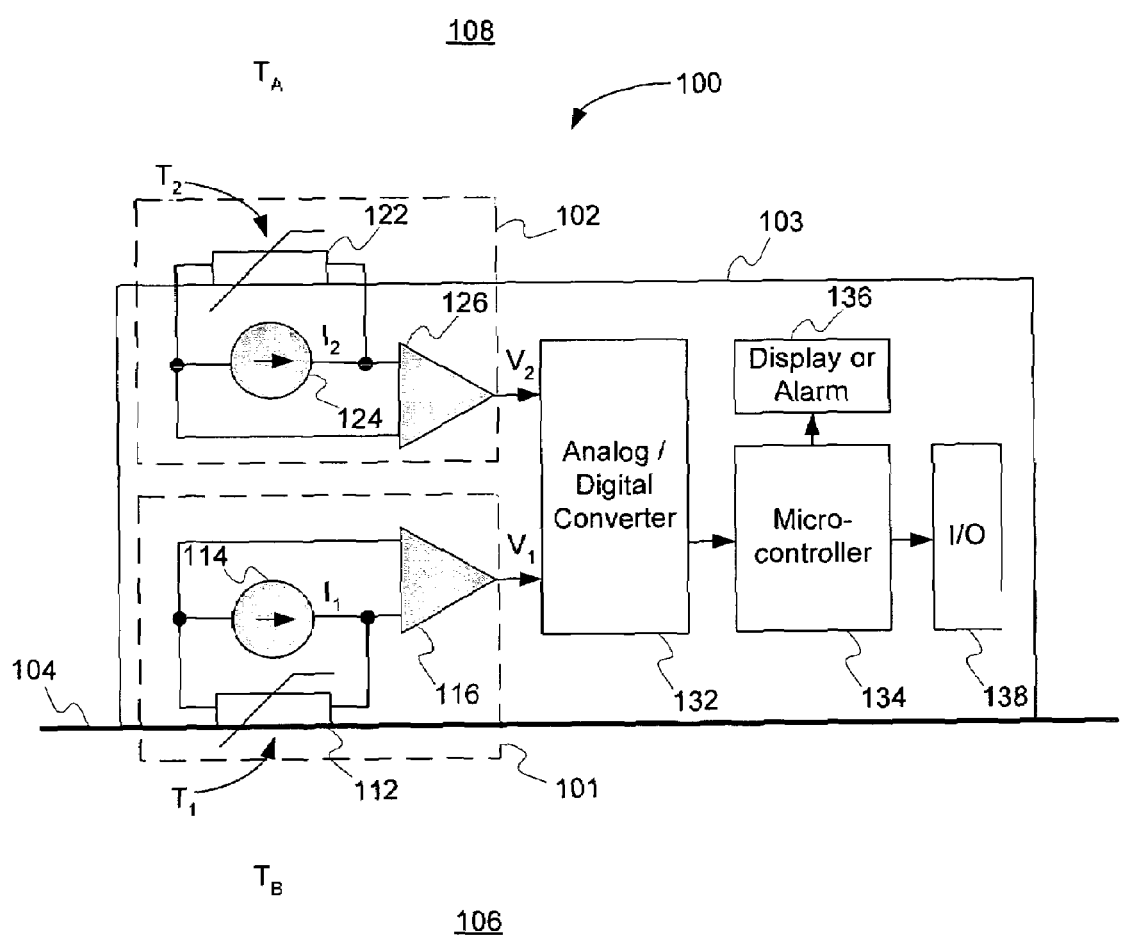
FIG. 1 is a block diagram showing an apparatus for the monitoring of body and ambient temperatures.

Referring to FIG. 1, there is shown a monitoring apparatus 100 for estimating the temperature of both a body 106 and the ambient air 108. The monitoring apparatus 100 has a casing 103 which includes a body temperature sensor 101, an ambient air temperature sensor 102, an Analog to Digital Converter (ADC) 132, a micro-controller 134 and an alarm/display 136. The body temperature sensor 101 includes a thermistor 112, which is in thermal contact with the epidermis 104, that converts a current $I_1$ from a current source 114 into a voltage. The voltage produced by the thermistor 112, which varies in correlation with the temperature of the body 106, $T_B$, is then amplified by an amplifier 116, resulting in a voltage $V_1$ indicative of a temperature $T_1$ measured at the contact between the epidermis 104 and body temperature sensor 101. Similarly, the ambient air temperature sensor 102, includes a thermistor 122, which is in thermal contact with the air 108 surrounding the monitoring apparatus 100, that converts a current $I_2$ from a current source 124 into a voltage. The voltage produced by the thermistor 122, which varies in correlation with the temperature of the ambient air 108, $T_A$, is then amplified by an amplifier 126, resulting in a voltage $V_2$ indicative of a temperature $T_2$ measured at the contact between the ambient air 108 and the ambient air temperature sensor 102. It is to be understood that the sensors may also be based on other sensing devices, for example temperature dependent resistances (RTD).

An Analog to Digital Converter (ADC) 132 then converts the analog signals from the amplifiers 116 and 126, represented by voltages $V_1$ and $V_2$, into digital signals which are provided to a micro-controller 134. The micro-controller 134 includes an algorithm that controls the operations of the apparatus and performs an estimation of body 106 and ambient air 108 temperatures, which will be further described below. The results of the estimation are then related to the wearer of the monitoring apparatus 100 by either setting a visual and/or audio alarm, when a certain temperature is detected, or displaying the result via alarm/display 136. Optionally, the monitoring apparatus 100 may also provide the temperature estimates to a further apparatus, using input/output interface 138, for further processing. It is to be understood that input/output interface 138 may use any suitable wire or wireless technologies for communicating with other apparatuses.

Figure 2:
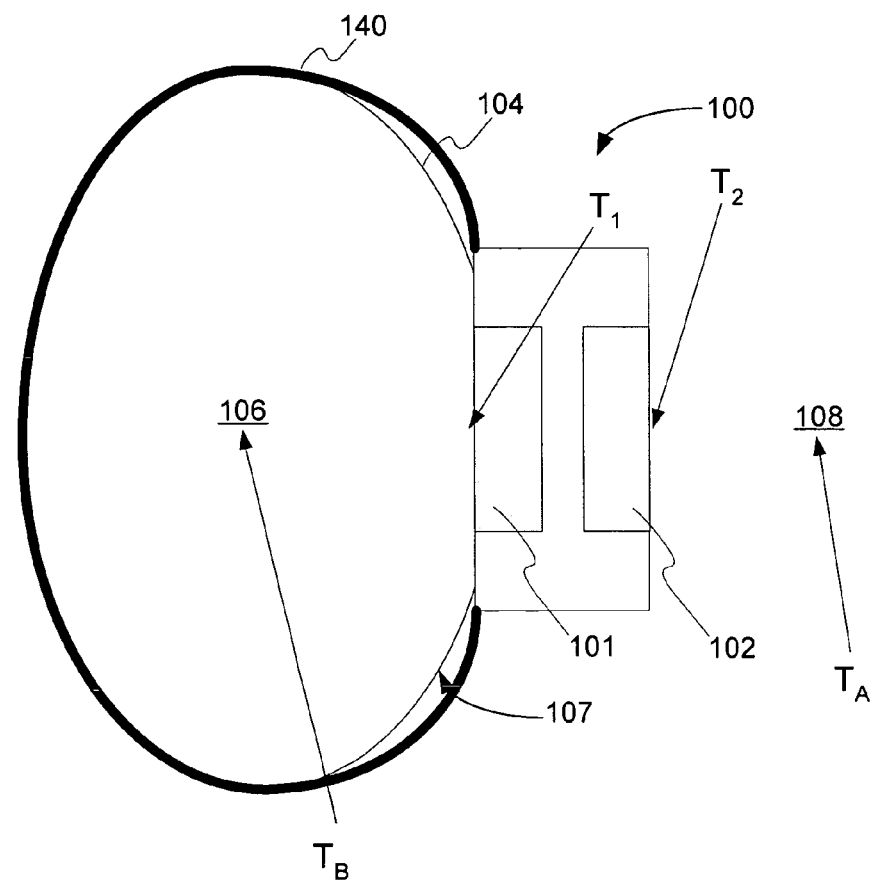
FIG. 2 is a sectional view of the apparatus of FIG. 1 shown in operating position.

FIG. 2 shows a sectional view of the monitoring apparatus 100 in a sample operating position. The casing 103 of the monitoring apparatus 100 is affixed to, for example, the arm 107 of an individual using a casing fastener 140, for example, a bracelet, a strap or an elastic band, so that the body temperature sensor 101 is in thermal contact with the epidermis 104 of the individual, while the ambient air temperature sensor 102 is in contact with the air 108 surrounding the monitoring apparatus 100.

Figure 3:
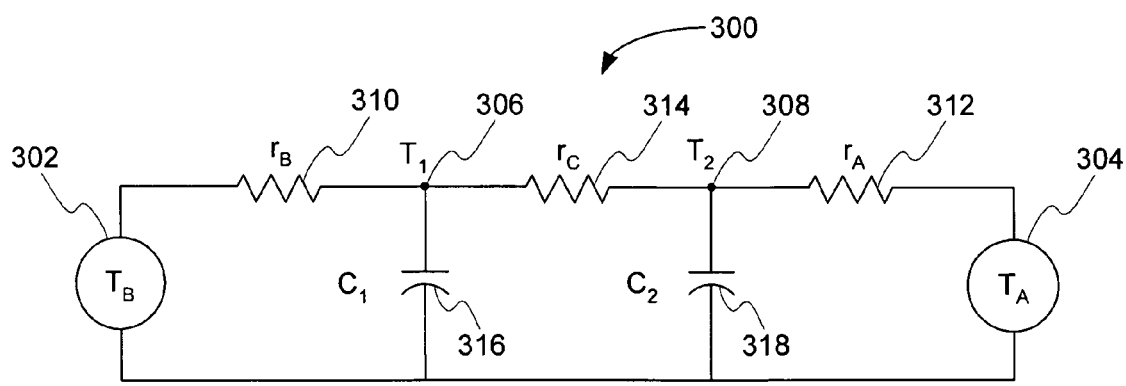
FIG. 3 is a schematic diagram of an electrical circuit analogy utilized for thermal modeling.

Referring now to FIG. 3, there is shown a schematic diagram of an electrical circuit analogy 300 used for the thermal modeling of the system illustrated by FIGS. 1 and 2. Within the electrical circuit analogy 300 there are two variable voltage sources 302 and 304, having values $T_B$ and $T_A$, that represent the thermal sources $T_B$ and $T_A$, the body 106 and the ambient air 108 temperatures, respectively. The temperatures $T_1$ and $T_2$, measured by the body temperature sensor 101 and ambient air temperature sensor 102, are identified as nodes 306 and 308, respectively. The body 106 temperature $T_B$ is transferred to the body temperature sensor 101 with a certain thermal resistivity, or thermal shunt, which is represented by a resistor 310 having a value of $r_B$. Similarly, the ambient air $T_A$ is transferred to the ambient air sensor 102 with a certain thermal resistivity, or thermal shunt, which is represented by a resistor 312 having a value of $r_A$. As well, there is a transfer of heat that takes place between the body temperature sensor 101 to the ambient air sensor 102 with a certain thermal resistivity, or thermal shunt, which is represented by a resistor 314 having a value of $r_C$. Completing the thermal model are capacitors 316 and 318, of values $C_1$ and $C_2$, respectively, representing the thermal capacity (capacity of storing thermal energy) of the body temperature sensor 101 in contact with the body 106 and the ambient air sensor 102 in contact with the ambient air 108.

From the electrical circuit 300 of FIG. 3, the following equations may be derived:

$$Q_B = \frac{T_B - T_1}{r_B}, \quad \text{Equation 1}$$

$$Q_A = \frac{T_2 - T_A}{r_A}, \quad \text{Equation 2}$$

$$Q_C = \frac{T_1 - T_2}{r_C}, \quad \text{Equation 3}$$

where $Q_B$ is the thermal flux from the body 106 to the body temperature sensor 101;

$Q_A$ is the thermal flux from the ambient air sensor 102 to the ambient air; and $Q_C$ is the thermal flux from the body temperature sensor 101 to the ambient air sensor 102.

We may further derive the following equations:

$$Q_1 = T_1 \cdot C_1 \cdot s, \quad \text{Equation 4}$$

$$Q_2 = T_2 \cdot C_2 \cdot s, \quad \text{Equation 5}$$

$$Q_B = Q_1 + Q_C, \qquad \text{Equation 6}$$

$$Q_C = Q_2 + Q_4, \qquad \text{Equation 7}$$

where $Q_1$ is thermal flux in capacitor 316;
$Q_2$ is thermal flux in capacitor 318; and
s is the Laplace variable.

Using Equations 1, 3, 4 and 6, we obtain:

$$\frac{T_B - T_1}{r_B} = T_1 \cdot C_1 \cdot s + \frac{T_1 - T_2}{r_C}. \qquad \text{Equation 8}$$

We may then isolate $T_B$:

$$T_B = \frac{r_C + C_1 \cdot s \cdot r_B \cdot r_C + r_B}{r_C} \cdot T_1 - r_B \cdot \frac{T_2}{r_C}. \qquad \text{Equation 9}$$

Similarly, using Equations 2, 3, 5 and 7, we obtain:

$$\frac{T_2 - T_A}{r_A} = \frac{T_1 - T_2}{r_C} - T_2 \cdot C_2 \cdot s. \qquad \text{Equation 10}$$

We may then isolate $T_A$:

$$T_A = \frac{r_C + r_A + C_2 \cdot s \cdot r_A \cdot r_C}{r_C} \cdot T_2 - r_A \cdot \frac{T_1}{r_C}. \qquad \text{Equation 11}$$

Equations 9 and 11 may be rewritten as follows:

$$T_B = \left(1 + \frac{r_B}{r_C} + C_1 \cdot s \cdot r_B\right) \cdot T_1 - \frac{r_B}{r_C} \cdot T_2, \qquad \text{Equation 12}$$

$$T_A = \left(1 + \frac{r_A}{r_C} + C_2 \cdot s \cdot r_A\right) \cdot T_2 - \frac{r_A}{r_C} \cdot T_1. \qquad \text{Equation 13}$$

From Equations 12 and 13 we may define the following transfer functions in the frequency domain by replacing s with $i2\pi f$:

$$H_1(f) = \left(1 + \frac{r_B}{r_C} + C_1 \cdot i2\pi f \cdot r_B\right), \qquad \text{Equation 14}$$

$$H_2(f) = -\frac{r_B}{r_C}, \qquad \text{Equation 15}$$

$$H_3(f) = -\frac{r_A}{r_C}, \qquad \text{Equation 16}$$

$$H_4(f) = \left(1 + \frac{r_A}{r_C} + C_2 \cdot i2\pi f \cdot r_A\right), \qquad \text{Equation 17}$$

resulting in:

$$T_B = H_1(f) \cdot T_1 + H_2(f) \cdot T_2, \qquad \text{Equation 18}$$

$$T_A = H_3(f) \cdot T_1 + H_4(f) \cdot T_2. \qquad \text{Equation 19}$$

Figure 4:
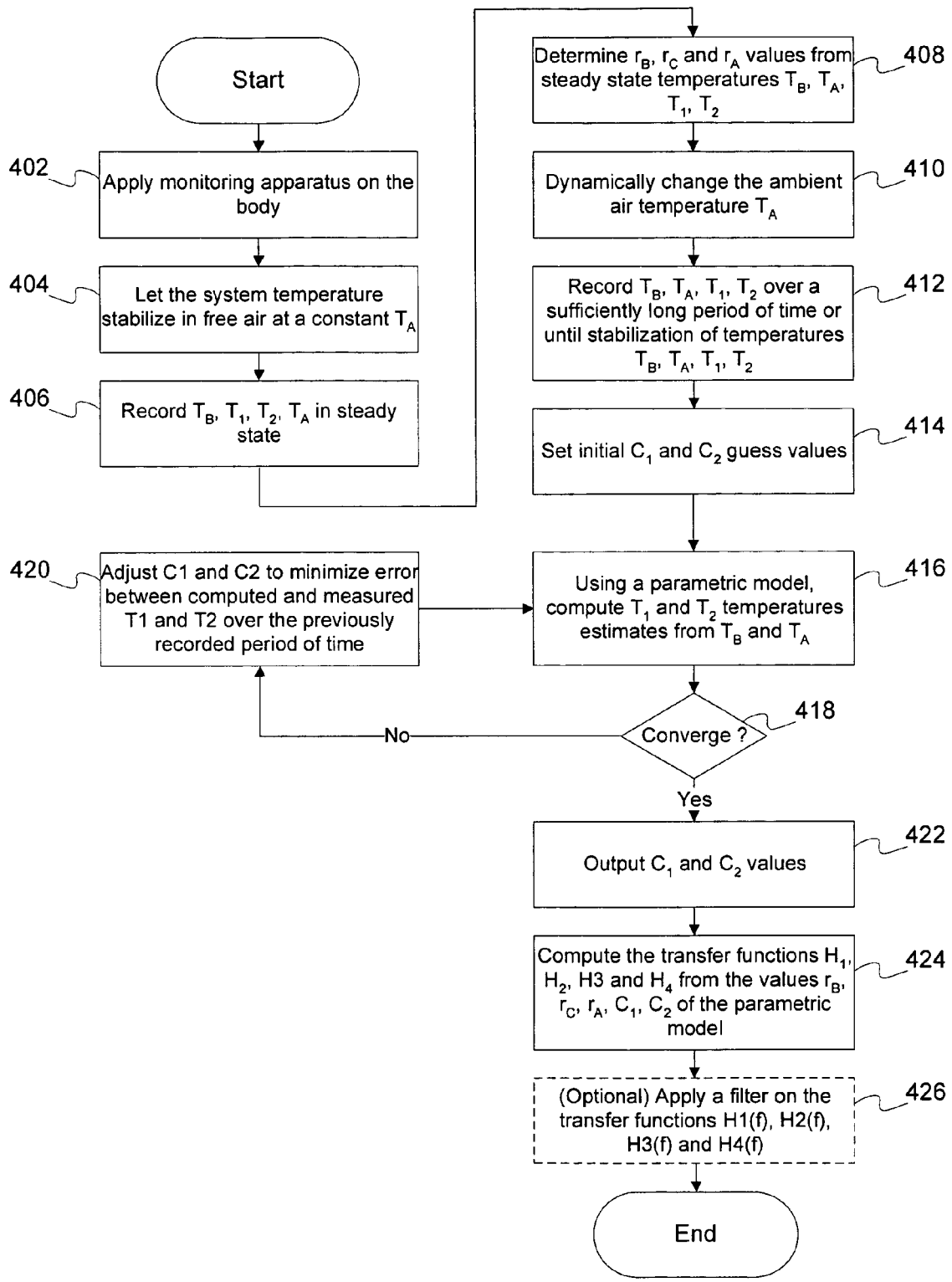
FIG. 4 is a flow diagram of an algorithm for the computation of thermal model components and transfer functions.

The values of $r_a$, $r_b$, $r_c$, $C_1$ and $C_2$, as well as the transfer functions $H_1(f)$, $H_2(f)$, $H_3(f)$ and $H_4(f)$ may be computed using an algorithm such as the one depicted by the flow chart shown in FIG. 4. The sequence of steps composing the algorithm is indicated by the sequence of blocks 402 to 426.

At block 402 the algorithm starts by applying the monitoring apparatus 100 on the body 106 of an individual, for example on the arm 107 of the individual using bracelet or strap 140. At block 404, the system, e.g. the body 106, the monitoring apparatus 100 and the ambient air, is let to stabilize at a constant ambient air temperature $T_A$.

At block 406 the algorithm records the values of $T_B$, $T_A$, $T_1$ and $T_2$, in steady state and at block 408, it determines normalized values of $r_a$, $r_b$ and $r_c$ using Equations 1, 2 and 3, assuming a nominal arbitrary value $Q = Q_1 = Q_2 = Q_3$, and the recorded values of $T_B$, $T_A$, $T_1$ and $T_2$. Values for $C_1$ and $C_2$ are not necessary at this point since in steady state s=0.

Then, at block 410, the algorithm dynamically changes the ambient air temperature $T_A$ using, for example, a step function and, at block 412, records the values of $T_B$, $T_A$, $T_1$ and $T_2$ over a sufficiently long period of time or until these values stabilize.

The algorithm then sets initial values for $C_1$ and $C_2$, at block 414, and computes, at block 416, $T_1$ and $T_2$ estimates using Equations 12 and 13 (or any other suitable parametric model) and the recorded values $T_B$ and $T_A$. At block 418, the algorithm verifies the convergence of the $T_1$ and $T_2$ estimates with the actual measured values of $T_1$ and $T_2$. If there is convergence, the algorithm proceeds to block 422, if not, it goes to block 420 where the values $C_1$ and $C_2$ are adjusted so as to minimize the error between the computed $T_1$ and $T_2$ estimates and the measured values of $T_1$ and $T_2$ using, for example, a curve fitting algorithm or any other suitable numerical optimization method. It should be noted that these operations may be executed in either the time or frequency domain. The algorithm then goes back to block 416 to compute new $T_1$ and $T_2$ estimates.

At block 422, the values of $C_1$ and $C_2$ are set and then, at block 424, the algorithm computes the transfer functions $H_1(f)$, $H_2(f)$, $H_3(f)$ and $H_4(f)$ from Equations 14, 15, 16 and 17. Optionally, at block 426, for ulterior use of $H_1(f)$, $H_2(f)$, $H_3(f)$ and $H_4(f)$, the algorithm may apply a filter to the transfer functions, such as, for example, a Wiener filter, in order to reduce noise effects induced at very high or specific frequencies, otherwise the algorithm ends.

EXAMPLE

Using the algorithm depicted by depicted by the flow chart shown in FIG. 4 with a value of 36.3 for $T_B$ and using a step function to vary the value of $T_A$, the following values were obtained:

$r_B := 1.8$;
$r_C := 3.5$;
$r_A := 5.6$;
$C_1 := 122$; and
$C_2 := 152$.

It should be noted that the difference in values between $C_1$ and $C_2$ is due to the fact that in the sample application of the monitoring apparatus 100 the body temperature sensor 101 was covered by a stainless steel, in contact with the epidermis 104 while the ambient air temperature sensor 102 was covered by glass in contact with the ambient air 108. Of course, other monitoring apparatus 100 applications are possible which use different sensor types and/or coverings.

In the above-described thermal model of the system illustrated in FIGS. 1 and 2, a variation in $T_B$ may also be viewed as a variation in $r_B$. Thus, in an alternative embodiment, if we know that the temperature $T_B$ of a user is constant, i.e. the user is not feverish, is not suffering from hypothermia or any other condition that may affect his body temperature, then $T_B$ may be fixed and $r_B$ let to vary. This in effect creates a blood flow monitor where $r_B$ is indicative of a rise or fall in the blood flow of the user since it is well known that the blood flow is the main factor that changes the thermal resistivity $r_B$.

In an alternative embodiment, the monitoring apparatus 100 may include an additional sensor with its associated thermistor; the additional sensor having its thermistor in contact with either the body 106 or the ambient air 108. The additional sensor would be set in the monitoring apparatus 100 such that it would create two additional thermal fluxes with the original set of thermistors, i.e. thermistors 112 and 122. This results in a thermal model similar to that of FIG. 3 but adding a node $T_3$, which represents the temperature measured by the additional sensor, electrical resistances similar to $r_C$, for example $r_C'$ and $r_C''$, between $T_3$ and $T_1$, and $T_3$ and $T_2$, respectively, and finally a capacitance $C_3$ in parallel with node $T_3$. It is to be understood that either or both of the values of $r_C'$ or $r_C''$ should be different than the value of $r_C$. This may be done by using a monitoring apparatus having varying geometry or by adding thermal insulation between at least one of the pairs of thermistors. It is to be understood that an extra $r_A$ or $r_B$ will connect either $T_A$ and $T_3$ or $T_B$ and $T_3$ depending on whether the thermistor of the additional sensor is in contact with the body 106 or the ambient air 108. The extra equations resulting from the modified circuit would then permit the evaluation of $r_B$ as well as $T_A$ and $T_B$. Thus, this alternative embodiment would permit the estimation of the blood flow ($r_B$) in addition to the body 106 and ambient air 108 temperatures, $T_A$ and $T_B$ respectively.

As mentioned previously, the micro-controller 134 includes an algorithm that controls the operations of the monitoring apparatus 100 and performs an estimation of body 106, as well as ambient air 108, temperatures, $T_B$ and $T_A$, respectively. An example of an algorithm that may be executed by the micro-controller 134 is depicted by the flow chart shown in FIG. 5. The sequence of steps composing the algorithm is indicated by the sequence of blocks 502 to 518.

At block 502 the algorithm starts by acquiring initial samples of N temperatures values at both the body temperature sensor 101 and the ambient air temperature sensor 102, identified as $T_{1N}(t)$ and $T_{2N}(t)$, respectively. At block 504, new samples of k temperatures values are acquired at both the body temperature sensor 101 and the ambient air temperature sensor 102, identified as $T_{1k}(t)$ and $T_{2k}(t)$, respectively.

At block 506, the algorithm concatenates the new k temperatures, $T_{1k}(t)$ and $T_{2k}(t)$, to the N previous temperatures, resulting in samples of size N+K $T_{1N+k}(t)$ and $T_{2N+k}(t)$, and at block 508, the first k temperatures are eliminated from $T_{1N+k}(t)$ and $T_{2N+k}(t)$, resulting once more in samples of size N $T_{1N}(t)$ and $T_{2N}(t)$. The steps described by blocks 504 to 508 produce samples of N temperature values from both the body temperature sensor 101 and the ambient air temperature sensor 102 every k sampling, each new sample having k new values.

At block 510, the samples $T_{1N}(t)$ and $T_{2N}(t)$ are windowed in order to ensure a smooth and continuous transition from one sample to the next, resulting in:

$$T_{1WN}(t)=T_{1N}(t) \times W(t), \qquad \text{Equation 20}$$

$$T_{2WN}(t)=T_{2N}(t) \times W(t), \qquad \text{Equation 21}$$

where

W(t) is a windowing function such as, for example, a Hanning function.

Then, at block 512, the algorithm proceeds to the frequency domain by computing the Fast Fourier Transform (FFT) of Equations 20 and 21, resulting in:

$$T_{1N}(f)=FFT(T_{1WN}(t)), \qquad \text{Equation 22}$$

$$T_{2N}(f)=FFT(T_{2WN}(t)). \qquad \text{Equation 23}$$

The algorithm then uses, at block 514, Equations 18 and 19 to evaluate the body 106 and ambient air 108 temperature equations in the frequency domain, $T_B(f)$ and $T_A(f)$, using transfer functions such as, for example, those of Equations 14, 15, 16 and 17, resulting in:

$$T_B(f)=H_1(f) \times T_{1N}(f)+H_2(f) \times T_{2N}(f) \qquad \text{Equation 24}$$

$$T_A(f)=H_3(f) \times T_{1N}(f)+H_4(f) \times T_{2N}(f) \qquad \text{Equation 25}$$

At block 516, the algorithm then converts the frequency domain equations of the body 106 and ambient air 108 temperatures, Equations 24 and 25, back into the time domain using the inverse Fast Fourier Transform (iFFT), resulting in:

$$T_B(t)=iFFT(T_B(f)), \qquad \text{Equation 26}$$

$$T_A(t)=iFFT(T_A(f)). \qquad \text{Equation 27}$$

Then at block 518, the algorithm samples the middle of the time window of both $T_B(t)$ and $T_A(t)$ to provide estimates of the body 106 and ambient air 108 temperatures, namely $T_B$ and $T_A$, respectively, which may then be related to the wearer of the monitoring apparatus 100 by either setting a visual and/or audio alarm, when a certain temperature is detected, or displaying the result via alarm/display 136. Temperatures $T_B$ and $T_A$ may also be provided to a further apparatus, using input/output 138, for further processing. Then, the algorithm proceeds back to block 504 where new samples of k temperature values are acquired and the process repeated.

Figure 5:
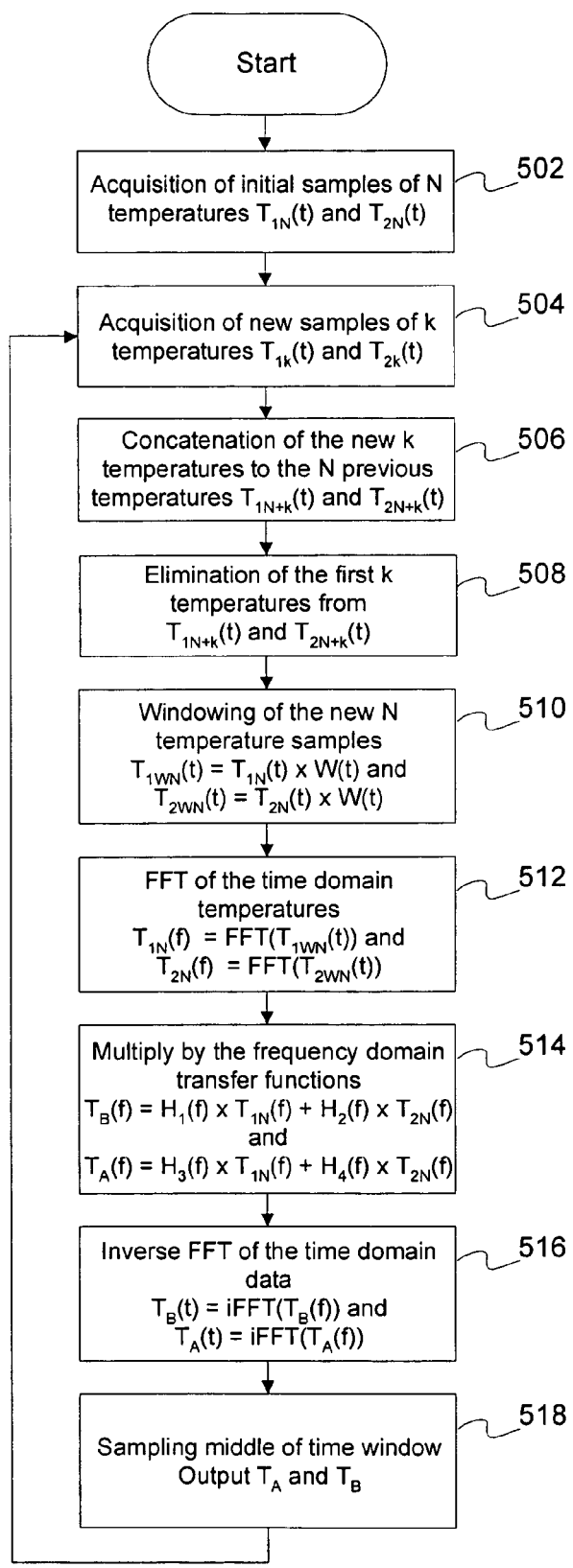
FIG. 5 is a flow diagram of an algorithm for the estimation of body temperature.

It should be understood that although the algorithm depicted by the flow chart shown in FIG. 5 uses FFT in the frequency domain, other methods such as, for example, time domain convolution may also be used.

Although the present invention has been described by way of particular embodiments and example thereof, it should be noted that it will be apparent to persons skilled in the art that modifications may be applied to the present particular embodiments without departing from the scope of the present invention. In particular, although reference has been made to the body 106 being that of a living being, in an alternative embodiment the body may be that of a miscellaneous object, in which case the epidermis 104 would represent a surface of the object.

What is claimed is:

1. A method for estimating at least one of a body temperature and an ambient air temperature, the method comprising:

acquiring surface values indicative of temperature from a first sensor in thermal contact with a surface of the body;

acquiring ambient values indicative of temperature from a second sensor in thermal contact with the ambient air;

applying a transfer function to the surface and ambient values forming an estimate of the at least one of a body temperature and an ambient air temperature; and providing the estimate of the at least one of a body temperature and an ambient air temperature;

wherein the transfer function is indicative of a thermal relationship between the body temperature, the surface values, the ambient air temperature and the ambient values, and the thermal capacity of the first and second sensors.

2. A method according to claim 1, further comprising processing the surface and ambient values and wherein the transfer function is indicative of a thermal relationship between the body temperature, the processed surface values, the ambient air temperature and the processed ambient values, and the thermal capacity of the first and second sensors.

3. A method according to claim 2, wherein the processing of the signals from the first and second sensors is done by the application of a windowing function.

4. A method according to claim 3, wherein the windowing function is a Hanning function.

5. A method according to claim 1, wherein the body is that of a living being.

6. A monitoring apparatus for estimating at least one of a body temperature and an ambient air temperature, the apparatus comprising:
  a casing including;
    a first sensor having an output generating a first signal varying in correlation with temperature, the first sensor being positioned adjacent a first surface of the casing;
    a second sensor having an output generating a second signal varying in correlation with temperature, the second sensor being positioned adjacent a second surface of the casing;
    an analog to digital converter having a first input connected to the output of the first sensor, a second input connected to the output of the second sensor and an output; and
    a micro-controller having an input connected to the output of the analog to digital converter and an output;
  wherein the micro-controller includes an algorithm for computing the estimate of the at least one of a body temperature and an ambient air temperature using a mathematical model indicative of a thermal relationship between the body temperature, the first signal, the ambient air temperature and the second signal, and the thermal capacity of the first and second sensors, the algorithm providing the estimate of the at least one of a body temperature and an ambient air temperature to the output of the micro-controller.

7. An apparatus according to claim 6, wherein sensors are thermistors.

8. An apparatus according to claim 6, wherein sensors are temperature dependent resistances.

9. An apparatus according to claim 6, wherein the output of the microcontroller includes at least one of a display, an alarm and an input/output interface.

10. An apparatus according to claim 6, further comprising a casing fastener for fastening the casing to the body.

11. An apparatus according to claim 10, wherein the casing fastener includes at least one of a bracelet, a strap and an elastic band.

12. An apparatus according to claim 6, wherein the body is that of a living being.

13. A method for estimating at least one of a body temperature and an ambient air temperature, the method comprising:
  acquiring surface values indicative of temperature from a first sensor in thermal contact with a surface of the body;
  acquiring ambient values indicative of temperature from a second sensor in thermal contact with the ambient air;
  applying a transfer function to the surface and ambient values forming an estimate of the at least one of a body temperature and an ambient air temperature; and
  providing the estimate of the at least one of a body temperature and an ambient air temperature;
wherein the transfer function is obtained from a resistive and capacitive equivalent circuit of a thermal relationship between the body temperature, the surface values, the ambient air temperature and the ambient values.

14. A monitoring apparatus for estimating at least one of a body temperature and an ambient air temperature, the apparatus comprising:
  a casing including;
    a first sensor having an output generating a first signal varying in correlation with temperature, the first sensor being positioned adjacent a first surface of the casing;
    a second sensor having an output generating a second signal varying in correlation with temperature, the second sensor being positioned adjacent a second surface of the casing;
    an analog to digital converter having a first input connected to the output of the first sensor, a second input connected to the output of the second sensor and an output; and
    a micro-controller having an input connected to the output of the analog to digital converter and an output;
  wherein the micro-controller includes an algorithm for computing the estimate of the at least one of a body temperature and an ambient air temperature using a mathematical model transfer function obtained from a resistive and capacitive equivalent circuit of a thermal relationship between the body temperature, the first signal, the ambient air temperature and the second signal, the algorithm providing the estimate of the at least one of a body temperature and an ambient air temperature to the output of the micro-controller.

* * * * *